(12) United States Patent
Speker et al.

(10) Patent No.: US 11,045,901 B2
(45) Date of Patent: Jun. 29, 2021

(54) LASER WELDING OF STEEL WITH POWER MODULATION FOR HOT-CRACKING PREVENTION

(71) Applicant: TRUMPF Laser- und Systemtechnik GmbH, Ditzingen (DE)

(72) Inventors: Nicolai Speker, Pleidelsheim (DE); Marcel Schäfer, Ditzingen (DE); Philipp Scheible, Illingen (DE); Thomas Graf, Nufringen (DE); Peter Stritt, Stuttgart (DE)

(73) Assignee: TRUMPF Laser-und Systemtechnik GmbH, Ditzingen (DE)

( * ) Notice: Subject to any disclaimer, the term of this patent is extended or adjusted under 35 U.S.C. 154(b) by 210 days.

(21) Appl. No.: 16/133,917

(22) Filed: Sep. 18, 2018

(65) Prior Publication Data
US 2019/0039176 A1 Feb. 7, 2019

Related U.S. Application Data

(63) Continuation of application No. PCT/EP2017/054464, filed on Feb. 27, 2017.

(30) Foreign Application Priority Data

Mar. 18, 2016 (DE) .................. 102016204578.4

(51) Int. Cl.
*B23K 26/06* (2014.01)
*B23K 26/24* (2014.01)
*B23K 26/32* (2014.01)

(52) U.S. Cl.
CPC .......... *B23K 26/0626* (2013.01); *B23K 26/06* (2013.01); *B23K 26/24* (2013.01); *B23K 26/32* (2013.01)

(58) Field of Classification Search
None
See application file for complete search history.

(56) References Cited

U.S. PATENT DOCUMENTS 4,711,986 A * 12/1987 Lillquist ............... B23K 9/296
219/130.01
4,859,830 A * 8/1989 Case, Jr. .............. B23K 9/0956
219/130.01
(Continued)

FOREIGN PATENT DOCUMENTS

CN 1550282 1/2004
CN 102990224 3/2013
(Continued)

OTHER PUBLICATIONS

Heider et al., "Power modulation to stabilize laser welding of copper," Journal of Laser Applications, 2015, 27: 022003.
(Continued)

*Primary Examiner* — Tu B Hoang
*Assistant Examiner* — Masahiko Muranami
(74) *Attorney, Agent, or Firm* — Fish & Richardson P.C.

(57) ABSTRACT

A laser beam directed is moved relative to a workpiece to weld along a weld seam and form a weld pool in the area surrounding the laser beam. The weld pool has a characteristic oscillation frequency $f_{co}$, and a laser power is modulated with a modulation frequency f and a modulation amplitude $\Pi = 1 - P_{min}/P_{max}$, where $P_{min}$ is minimal and $P_{max}$ is maximal laser power during a modulation period. For a normalized characteristic oscillation frequency $\Lambda_{co}$ and a normalized modulation frequency $\Lambda$, $\Lambda \geq 2.2 * \Lambda_{co}$, with $\Lambda = f \cdot d_f / v$, where v is the feed rate of the laser beam, and $d_f$ is diameter of a beam focal spot. Also, $\Lambda_{co} = f_{co}^{test} \cdot d_{f,co}^{test} / v_{co}^{test}$, where $f_{co}^{test}$ is a measured characteristic oscillation frequency, $d_{f,co}^{test}$ the diameter of the beam focal spot, and
(Continued)

$v_{co}^{test}$ is the feed rate of laser beam, all during a test measurement without modulation of the laser power.

26 Claims, 15 Drawing Sheets

(56) References Cited

U.S. PATENT DOCUMENTS

| | | | | |
|---|---|---|---|---|
| 5,086,207 | A * | 2/1992 | Deam | B23K 9/0956 |
| | | | | 219/130.01 |
| 5,665,255 | A * | 9/1997 | Busuttil | B23K 26/06 |
| | | | | 219/121.63 |
| 6,329,635 | B1 * | 12/2001 | Leong | B23K 26/032 |
| | | | | 219/121.83 |
| 6,483,072 | B2 | 11/2002 | Tsukamoto et al. | |
| 6,900,410 | B2 | 5/2005 | Tsukamoto et al. | |
| 2004/0026381 | A1 * | 2/2004 | Tsukamoto | B23K 26/06 |
| | | | | 219/121.6 |
| 2007/0289955 | A1 * | 12/2007 | Tsukamoto | B23K 26/06 |
| | | | | 219/121.64 |
| 2012/0325787 | A1 * | 12/2012 | Hamada | B23K 9/167 |
| | | | | 219/121.64 |

FOREIGN PATENT DOCUMENTS

| | | |
|---|---|---|
| CN | 103648707 | 3/2014 |
| CN | 104625414 | 5/2015 |
| CN | 104979748 | 10/2015 |
| CN | 105246637 | 1/2016 |
| DE | 601 11 790 | 4/2006 |
| DE | 10 2009 056 592 | 6/2011 |
| DE | 10 2012 021 755 | 5/2014 |
| JP | H09 108872 | 4/1997 |
| JP | 2005/238323 | 9/2005 |
| JP | 2008-73771 | 4/2008 |

OTHER PUBLICATIONS

Schneider, "Von Werkzeugstahl bis zur Superlegierung," Laser Technik Journal, Apr. 2013, 24-27 (with English abstract).
Stritt, "Remote LaserstmhlschweiBen von Aluminium—Modellierung und Experiment," VEDIS-Treffen, Apr. 2013, 33 pages (with English abstract).
Stritt et al., "HeiBrisskriterium rur das randnahe LaserstrahlschweiBen von Aluminium," Workshop—HeiBrissbildung beim LaserstrahlschweiBen, Stuttgart, 2014, 28 pages (with English abstract).
Schafer et al., "Analyzing Hot crack Formation in Laser Welding of Tempered Steel," Lasers in Manufacturing Conference 2015, 2015, 7 pages.
Weberpals et al., Laser Beam Remote Welding of Aluminum Hang-On Parts, EALA 2015, 2015, 19 pages.
International Preliminary Report on Patentability in International Application No. PCT/EP2017/054464, dated Sep. 27, 2018, 8 pages (English translation).
International Search Report and Written Opinion in International Application No. PCT/EP2017/054464, dated May 19, 2017, 24 pages (with English translation).
CN Office Action in Chinese Appln. No. 201780018173.8, dated Oct. 8, 2019, 8 pages (with English translation).
KR Notice of Allowance in Korean Appln. No. 10-2018-7030157, dated Oct. 7, 2020, 6 pages (with English translation).

* cited by examiner

LASER WELDING OF STEEL WITH POWER MODULATION FOR HOT-CRACKING PREVENTION

CROSS REFERENCE TO RELATED APPLICATIONS

This application is a continuation of and claims priority under 35 U.S.C. § 120 from PCT Application No. PCT/EP2017/054464 filed on Feb. 27, 2017, which claims priority from German Application No. DE 10 2016 204 578.4, filed on Mar. 18, 2016. The entire contents of each of these priority applications are incorporated herein by reference.

TECHNICAL FIELD

The disclosure relates to methods for laser beam welding of a workpiece.

BACKGROUND

Laser beam welding is used for welding workpieces that are to be made quickly (with high feed rate) or subjected to only slight thermal deformation. Laser beam welding can also be used to produce narrow and slender seam forms.

During laser beam welding, a so-called weld pool of melted workpiece material is formed on the workpiece around the focal spot of the laser beam. This weld pool substantially migrates with the laser beam as it propagates relative to the workpiece; remote from the laser beam, the workpiece material solidifies again. The re-solidified workpiece material forms a weld seam.

During hardening of the workpiece material, so-called hot cracks can form. The hot cracks can greatly impair the strength of the weld seam. It is therefore desirable to conduct the laser welding process in such a way as to keep the hot cracks in the weld seam as small as possible or to prevent them entirely.

U.S. Pat. No. 6,900,410 B2 describes a method of laser beam welding, wherein the laser power is pulse-modulated and wherein the modulation frequency corresponds to a natural oscillation frequency of the weld pool. Welding defects such as cracks are said to be prevented thereby. The laser welding was done on steel plates.

DE 601 11 790 T2 (also U.S. Pat. No. 6,483,072 B2) describes a laser welding method in which the laser power is altered by periodic pulsing, wherein a basic output power is 50% or more of a peak output power and the power fluctuation frequency is 200 Hz or less. The proposed penetrating depths of the laser beam is 10 mm or more. The method is said to prevent weld defects.

DE 10 2009 056 592 A1 recommends control of the energy input into the weld pool during laser welding by power modulation. A higher laser power is overlaid over a basic laser power level in a pulse-like manner. Frequencies of 50-500 Hz are disclosed. JP H09 108872 A likewise describes pulsed power modulation for laser welding. Galvanized steel plates were processed at a frequency of around 50 Hz.

M. Schneider's "Von Werkzeugstahl bis zur Superlegierung" [From Tool Steel to Super Alloy] Laser-Journal April 2013, pp 24-27, describes a pulsed laser to be used for laser beam welding and an adjustment to the absorption behavior of the workpiece be made using thermal pulse formation. Hot cracks should be prevented with post pulse phases. Furthermore, through modulation of the laser power, the weld pool dynamics and thus the solidification morphology can be influenced.

The recommended modulations of laser power can frequently reduce the cracking tendency, but in many cases even when using modulated laser power a still considerable quantity of hot cracks may be found in the weld seams. This applies in particular for workpieces made of steel when the laser power is modulated with a frequency corresponding to the natural oscillation frequency of the weld pool, as is recommended in U.S. Pat. No. 6,900,410 B2.

A. Heider et al., Journal of Laser Applications, Vol. 27, No. 2, describes laser power modulation to stabilize the laser welding of copper. A sinusoidal modulation was applied. In addition, it was recommended that a normalized modulation amplitude Π and normalized modulation frequency Λ be considered. The application of power modulation was also recommended for aluminum workpieces, for example P. Stritt et al. Heißrisskriterium für das randnahe Laserstrahlschweißen von Aluminum [Hot Crack Criterion for Near-Edge Laser Beam Welding of Aluminum] Contribution Workshop—Heißrissbildung beim Laserstrahlschweißen [Hot Crack Formation During Laser Beam Welding] University of Stuttgart Nov. 18, 2014. Sinusoidal modulation at a frequency of 40 Hz was used.

From M. Schäfer et al. "Analysing Hot Crack Formation in Laser Welding of Tempered Steel," Conference Contribution "Lasers in Manufacturing Conference 2015", Wissenschaftliche Gesellschaft Lasertechnik [Scientific Association for Laser Technology] e.V. (WLT), it is known that when a laser with high beam quality is used (beam parameter product SPP of 2 mm*mrad) and high image ratio, hot cracks can be prevented. Even during through-welding (where the laser beam breaks through the workpiece), no hot cracks were observed. The use of high-quality lasers is expensive, however, and comes along with an altered narrow seam geometry; in addition, through-welding is suitable only for specific workpiece types.

DE 10 2012 021 755 A1 discloses that, to prevent hot cracks during laser beam welding, a continuous weld seam should be assembled from weld seam pieces, wherein a temporal interruption must be maintained between production of directly abutting weld seam pieces. This process is complex and requires suitable fast scanner optics.

SUMMARY

Advantages described by the methods described herein include further reduction in the formation of hot cracks in a simple manner during laser beam welding of workpieces made of steel, up to the point of complete prevention of same.

In some embodiments, the modulation frequency f is chosen such that for a normalized characteristic oscillation frequency $\Lambda_{co}$ of the focal spot and a normalized modulation frequency $\Lambda$ applies where $\Lambda \geq 2.2 * \Lambda_{co}$, e.g., $\Lambda \geq 2.7 * \Lambda_{co}$, with $\Lambda = f \cdot d_f / v$, where v is the feed rate of the laser beam relative to the workpiece, dr is the diameter of a laser beam focal spot of the laser beam, and $\Lambda_{co} = f_{co}^{test} \cdot d_{f,co}^{test} / v_{co}^{test}$ and is determined from a test measurement with the laser beam without modulation of the laser power, where $f_{co}^{test}$ is the measured characteristic oscillation frequency in the test measurement, $d_{f,co}^{test}$ is the diameter of the laser beam focal spot during the test measurement, and $v_{co}^{test}$ is the feed rate of laser beam relative to workpiece during the test measurement.

The weld pool oscillation is a substantially periodic enlargement and reduction of the weld pool, which in general (if countermeasures are not taken) occurs during laser beam welding, regardless of possible weld spatters. The weld pool oscillation can be recognized, for example, by the weld pool length over time, and can be thermographically identified with a suitable infrared (IR) camera.

The choice of the modulation frequency f or the normalized modulation frequency $\Lambda$ in laser beam welding of workpieces made of steel has considerable importance for the prevention of hot cracks. In applying a modulation frequency f (or normalized modulation frequency $\Lambda$) that corresponds to the characteristic oscillation frequency $f_{co}$ (or the normalized characteristic oscillation frequency $\Lambda_{co}$) there is already some reduction in hot cracks compared to unmodulated laser beam welding. But when the normalized modulation frequency $\Lambda$ is chosen such that it is markedly greater than the normalized characteristic oscillation frequency $\Lambda_{co}$ of the weld pool, an even more marked reduction of hot cracks and thus significantly better weld seam quality can be achieved.

The weld pool oscillates with the characteristic oscillation frequency $f_{co}$ when the workpiece is welded with the laser beam without modulation of the laser power, but otherwise under the same conditions, regardless of possible weld spatters. The characteristic oscillation frequency $f_{co}$ depends on the workpiece.

The normalized characteristic oscillation frequency $\Lambda_{co}$ can be determined with a test measurement in advance, if applicable also with the deviating feed rate and/or deviating diameter of the focal spot of the laser and otherwise the same conditions as in the actual later laser beam welding. In the test measurement, no power modulation is applied; the average laser power however corresponds to the later actual laser beam welding. If the test measurement and the actual (modulated) laser beam welding are done with the same feed rate and same diameter of the laser beam focal spot, then $f_{co} = f_{co}^{test}$, and simply $f \geq 2.2 * f_{co}^{test}$, e.g., $f \geq 2.7 * f_{co}^{test}$ applies. A test measurement can be performed, for example, in the form of "sandwich" welding and/or by using thermographic measurement equipment.

In practice, the modulation frequencies f are usually between 5 and 200 Hz. The modulation is typically applied during the entire laser welding process of the weld seam; however, during through-welding (which in general does not cause hot cracks) the modulation can be dispensed with.

The methods described herein are easily realizable with a common power control so for lasers (for instance the TruControl® software of the TRUMPF Co.) and can be realized with an average beam quality (beam parameter product SPP for example of 16 mm*mrad, or 12 mm*mrad$\leq$SPP$\leq$20 mm*mrad). The laser beam welding can be carried out with conventional processing optics (for instance with a collimation lens and focusing lens); additional beam conversion optics are not necessary. The seam shape can be largely retained.

The method can be used to prepare axial round seams or radial round steams. The processed workpieces can be, for example, gearbox parts (such as ratchets or idler gears) or laser-welded steel pistons.

In some embodiments, for the normalized characteristic oscillation frequencies $\Lambda_{co}$ of the weld pool and the normalized modulation frequency $\Lambda$, $\Lambda \leq 8.5 * \Lambda_{co}$, e.g., $\Lambda \leq 7.3 * \Lambda_{co}$. For too-large normalized oscillation frequencies, in practice some increase in the hot cracks was observed. Altogether the best results were achieved in the examined steel workpieces in an interval of $2.2 * \Lambda_{co} \leq \Lambda \leq 8.5 * \Lambda_{co}$, e.g., $2.7 * \Lambda_{co} \leq \Lambda \leq 7.3 * \Lambda_{co}$, where the fewest hot cracks were achieved.

In some embodiments, for the normalized modulation frequency $\Lambda$ it further applies that: $0.2 \leq \Lambda \leq 1.0$. For a normalized modulation frequency below 0.2, in practice there have been marked fluctuations in the welding penetration depth, which can be prevented or reduced to a permissible minimum by a $\Lambda \geq 0.2$. For too-large normalized modulation frequencies, an increase in the hot cracks was observed, which can be prevented by a $\Lambda \leq 1.0$, e.g., $0.25 \leq \Lambda \leq 0.9$ or $0.3 \leq \Lambda \leq 0.8$.

In some embodiments, the modulation amplitude $\Pi$ is chosen such that $\Pi > 0.5$, e.g., $\Pi \geq 0.75$, or $\Pi \geq 0.8$. With these normalized modulation amplitudes of $\Pi$, especially good crack prevention was obtained, e.g., with $\Pi \geq 0.6$.

Likewise, in some embodiments the modulation amplitude $\Pi$ is $\leq 0.95$, e.g., $\Pi \leq 0.85$, or $\Pi \leq 0.80$. Also at these normalized modulation amplitudes, especially good crack prevention was obtained, e.g., with $0.6 \leq \Pi \leq 0.95$ or $0.75 \leq \Pi \leq 0.85$ Typically, the method takes place completely in a deep welding mode, so that the metal vapor capillary does not collapse at any point in time.

In some embodiments, the laser beam welding is conducted with a welding penetration depth EST, with $1.0 \text{ mm} < \text{EST} < 10.0 \text{ mm}$, e.g., $3.5 \text{ mm} \leq \text{EST} \leq 8.0 \text{ mm}$. With these welding penetration depths, prevention of hot cracks in steel is frequently difficult; with the selection of the (normalized) modulation frequency, however, a marked reduction of the hot crack tendency can be achieved. The laser welding method is suited to remain in deep welding mode (and not to change over to heat conduction mode) during the entire welding process, which improves seam quality.

Advantageously, in some embodiments the laser power is modulated in an approximately sinusoidal manner, e.g., wherein the sine form is approximated by at least 12, or by at least 18 supporting points per modulation period. Through the sine form, high frequency components in the modulation are avoided, which has proven favorable for low hot crack probability. The use of supporting points is especially simple. Alternatively, pulsed modulation can also be used.

In further embodiments, the laser beam is produced by a solid-state laser, for instance an Nd-YAG or Yb-YAG laser. Solid-state lasers, with respect to their power absorption mechanism, display a favorable behavior vis-a-vis steel materials (e.g., their melting and boiling temperature, mechanical strength, etc.) in supporting crack prevention.

In some embodiments, an average laser power of the laser beam in laser beam welding of a start region of the weld seam is increased, e.g., linearly increased, with advancing welding path, and an average laser power of the laser beam during laser beam welding of an end region of the weld seam is reduced, e.g., linearly reduced, with advancing welding path. During the laser beam welding of the start region and the end region, the laser power is modulated. The modulation of laser power provided with the above specifications for the (normalized) modulation frequency is also well suited to reduce or prevent hot cracks in the start region and end region of a weld seam in which the average (mean) laser power is continuously or in several steps raised or lowered ("ramps"). This especially applies to the case when the start or end region lies in an overlap region of two weld seams or weld seam sections. By the ramps, the welding process can be rendered uniform, which prevents local welding defects. The normalized modulation amplitude $\Pi$ and the normalized modulation frequency $\Lambda$ remain constant in laser welding of the entire workpiece, including the start region and the end region, in each case. Alternatively, different modulation frequencies Λ can be chosen for different sections of the weld seam, to better coordinate the frequency ratios of power modulation and characteristic oscillation to one another.

In some embodiments, with laser beam welding of a middle region of the weld seam between the start region and the end region, the laser power is modulated, and that the laser beam welding in the middle region is carried out as in-welding. Hot cracks can be reduced or prevented in the entire weld seam. In-welding means that the laser beam ends within the workpiece and does not break through the workpiece.

In some embodiments, during laser beam welding of a middle region of the weld seam between the start region and the end region, the laser power is not modulated, and the laser beam welding in the middle region is carried out as through-welding. In the regime of through-welding, no hot cracks have been observed even without power modulation, so that in the middle region modulation of the laser power can be dispensed with. In the start region and the end region however, the power modulation is to be applied with the condition for the normalized modulation frequency. The start and end regions of a weld seam are typically carried out as in-welding. Through-welding means that the laser beam breaks through the workpiece, in contrast to in-welding.

In some embodiments, during laser beam welding of the middle region, a constant average laser power is applied. In this way, a uniform welding seam can be obtained.

In other embodiments, the start region and the end region of the weld seam overlap with a different part of the weld seam. The weld seam can then be configured in an annularly closed manner. Cracks in the weld seam overlap of join connections in workpieces made of steel have been difficult to prevent up until now. As described herein, cracks in the weld overlap can be prevented simply and without large investments in plant and system technology.

Advantageously, the different parts of the weld seam belong to the middle region of the weld seam. In other words, one ramp does not overlap with another ramp, but with a normal part of the weld seam. Local weak points in the weld seam can be prevented; the weld seam becomes especially high-grade.

The weld seam can be an axial round seam or radial round seam, wherein the start region and the end region follow one another directly after completion of the weld seam in the circumferential direction. For these seam types, the method has especially proven itself. Through direct following of the start region and end region, double welds can be minimized.

In some embodiments, the start region and/or the end region of the weld seam overlap with a part of another weld seam. Weld seams can thereby be closed on one another, in particular for the production of complex workpieces. Cracks in the weld seam overlap of join connections in workpieces made of steel have been difficult to prevent up until now. With the method, cracks in the weld overlap can be simply prevented and without large investments in plant and system technology.

The respective other weld seam likewise can be produced with a ramp-like start region, a middle region, and ramp-like end region, and a respective part of the other weld seam belongs to the middle region of the other weld seam. The start region of the other weld seam and the end region of the weld seam directly follow one another after completion of the weld seam and the other weld seam. In other words, one ramp does not overlap another ramp of the respective other weld seam but overlaps with a normal part of the respective other weld seam. Local weak points in the combined weld seam can be prevented, the combined weld seam is especially high-grade. Through direct following of the start region of the other weld seam and end region of the weld seam, double welds can be minimized.

In various embodiments, during laser beam welding of a workpiece, an additive material is supplied that spreads in the weld pool. The additive material can be supplementary wire. By the additive material, the quality of the weld seam can be improved, and an improved strength can be achieved. The additive material makes it possible to add chemical elements to the weld pool or to the weld seam, which are not present in the workpiece parts to be welded, or not in the concentration desired for the weld seam. Through the modulation of the laser power, the weld pool dynamics are acted upon, and especially good mixing of the weld seam or the join zone with the additive material can be achieved. When an additive material is used, a high modulation depth of the laser power has especially proven itself, especially with $\Pi \geq 0.7$, e.g., $\Pi \geq 0.8$ The additive material or the supplementary wire can contain nickel or silicon.

In some embodiments, during laser beam welding of the workpiece, two workpiece parts that are produced from different materials are welded to one another. Through the supplied additive material, a weld seam can be provided with mediating properties, so that a good mechanical connection with the materials of both workpiece parts can be established. The two workpiece parts can be made of different types of steel. The workpiece parts typically are arranged one behind the other in the direction of the laser beam, wherein the weld pool extends through the front (top) workpiece part into the farther (lower) workpiece part; typically at least ⅓ of the depth extent of the weld pool (or the later weld seam) lies in the farther (lower) workpiece part. In the scope of the power modulation, here again good mixing of the weld pool can be achieved.

Advantageously, in some embodiments, one of the workpiece parts is made of steel, e.g., QT steel, and the other workpiece part is made of a non-steel material, e.g., an aluminum alloy. With the supplied additive material and the improved mixing from the power modulation, also in this case weld seams of good quality can be produced.

Further advantages of the invention may follow from the description and the drawing. Likewise, the above named and the still further listed features in each case may be used individually for themselves or together in any combination. The shown and described embodiments are not to be understood as an exhaustive list, but rather are illustrative in nature for the description of the invention.

DESCRIPTION OF DRAWINGS

DETAILED DESCRIPTION s FIG. 1 shows a diagram of the relative crack lengths of a weld seam, e.g., the portion on the total length of the weld seam in which hot cracks have appeared (plotted on the y-axis), as a function of the normalized frequency Λ with which the laser power during laser beam welding of the weld seam was sinusoidally modulated. The workpiece in each case was a QT steel of the type 42CrMoS4; the laser welding was done with a Yb-YAG laser, and the feed rate in each case was 1 m/min.

Without modulation there was a relative crack length of around 31% (see triangle on left with normalized frequency 0), for a continuous wave (cw) laser. The normalized characteristic oscillation frequency $Λ_{co}$ here was determined as 0.109.

For a normalized modulation amplitude Π (also called modulation depth) of 0.8 (the diamonds), with normalized frequencies of 0.2 to 1.0 there was a good reduction of relative crack length. For normalized frequencies of 0.3, 0.4, and 0.8, the weld seam was practically crack-free. With smaller normalized frequencies and larger normalized frequencies, the crack tendency increased noticeably.

For Λ=0.1, which here precisely corresponds to $Λ_{co}$, there is a relative crack length of around 16%, which does constitute a marked reduction in comparison with the unmodulated case but is markedly higher than the values achievable in the range of 0.2≤Λ≤1.0.

Note that the normalized modulation frequency Λ of 0.3 corresponds to around 2.7 times $Λ_{co}$, and the modulation frequency Λ of 0.8 corresponds to around 7.3 times $Λ_{CO}$.

For a normalized modulation depth Π (also called modulation depth) of 0.5 (the squares), there were in some instances reductions of the relative crack lengths in comparison with the unmodulated case, but the relative crack lengths obtained lay significantly above crack lengths attainable with Π=0.8.

Figure 1:
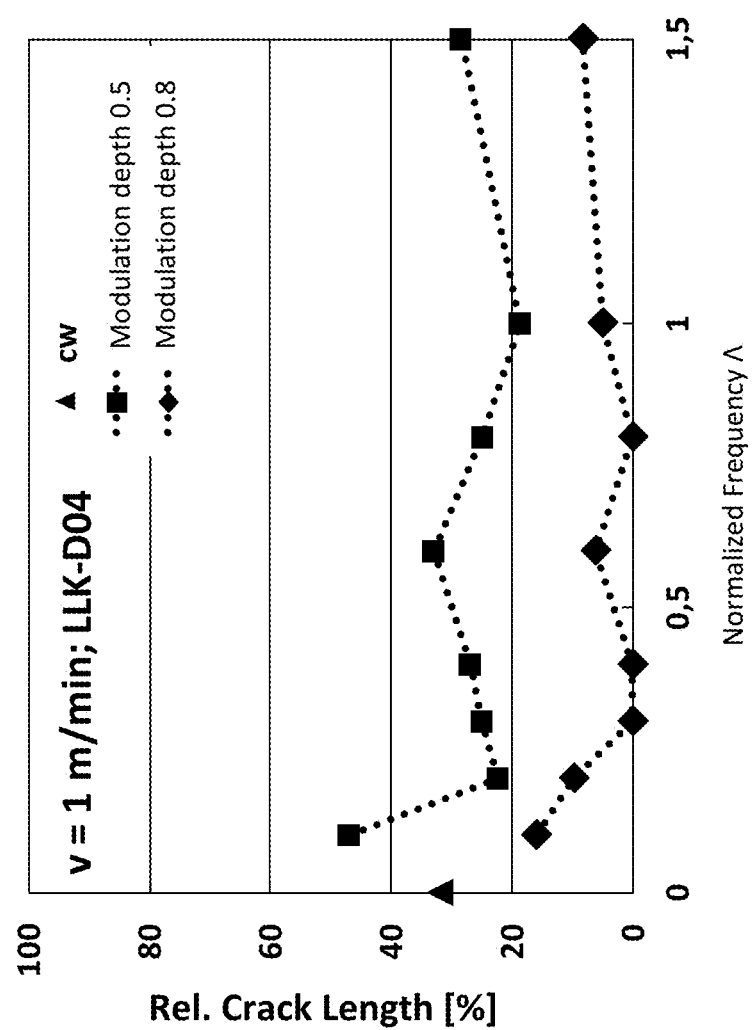
FIG. 1 is a graph illustrating the relative crack length (on the y-axis) of laser-welded workpieces of the same workpiece type with normalized oscillation frequency $\Lambda_{co}$ of 0.109, as a function of the normalized frequency Λ (on the x-axis) for two different modulation depths.
Figure 2:
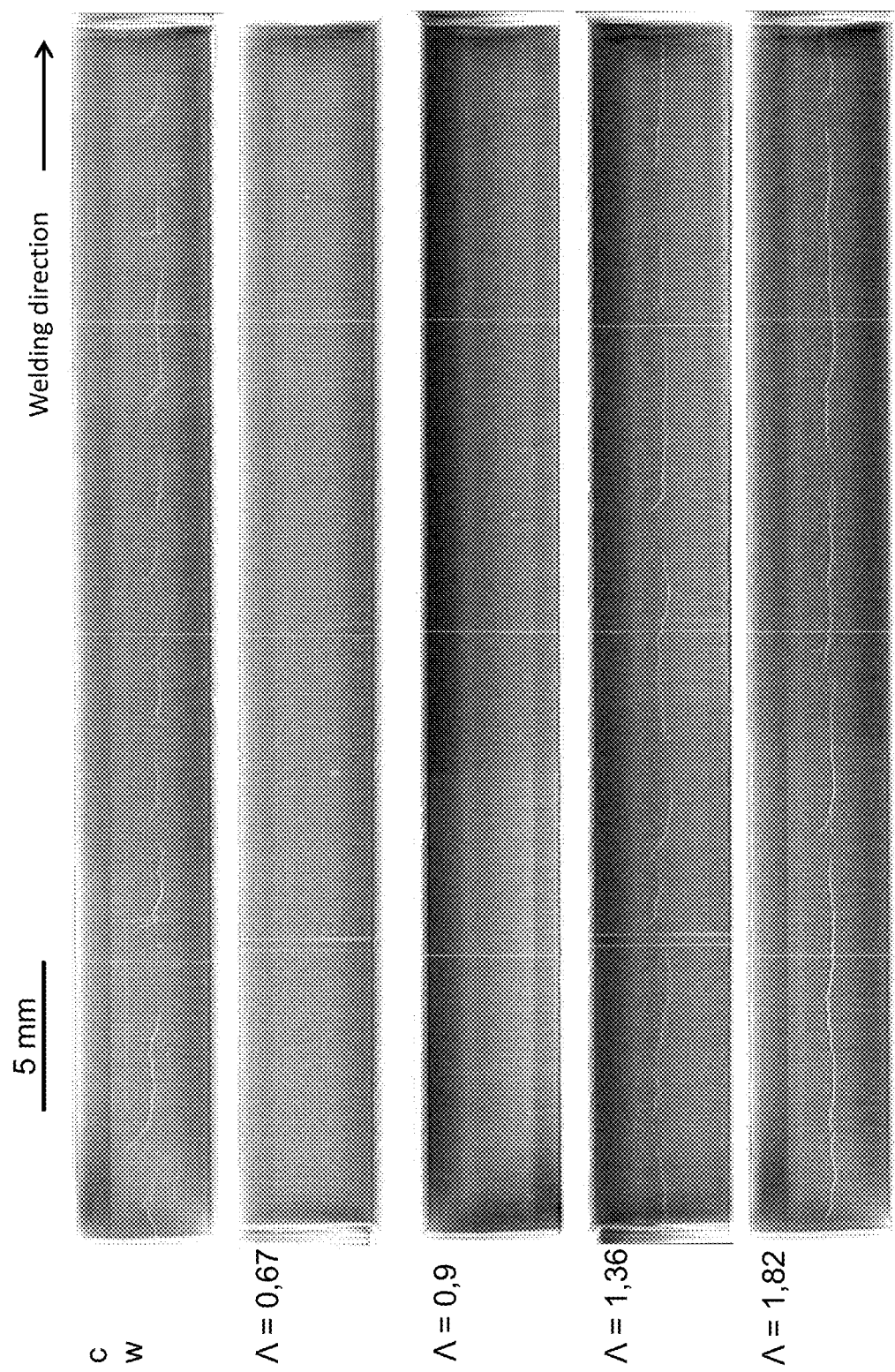
FIG. 2 is a series of radiographic images of weld seams of workpieces that are welded with different normalized modulation frequencies Λ with a modulation of the laser power.

In FIG. 2, radiographic images are shown to the side on the weld seam of laser beam welded workpieces, wherein in each case a sinusoidal power modulation was applied with different normalized modulation frequencies Λ. The workpieces consisted again of 42CrMoS4 QT steel; the welding penetration depth EST was 4 mm, the feed rate 4 m/min, with a beam parameter product of 16 mm*mrad.

In the unmodulated case (continuous wave) with temporally constant laser power, numerous extensive hot cracks are discernible in the weld seam. The characteristic oscillation frequency $f_{co}^{test}$ was determined at around 31.9 Hz, and the normalized characteristic oscillation frequency $Λ_{co}$ was 0.25 (with $d_{f,co}^{test}$=0.52 mm and $v_{co}^{test}$=4000 mm/60 s, sandwich test welding, construction steel/stainless steel).

In the cases where Λ=0.67 and Λ=0.9, no hot cracks are discernible in the weld seam.

For higher normalized modulation frequencies of Λ of 1.36 and 1.82, hot cracks are again discernible, in the case of Λ=1.82 even almost continuously. The normalized modulation frequency Λ is therefore chosen at 1.0 or smaller (with allowance for the remaining specifications, e.g., the relation to $Λ_{co}$).

Figure 3:
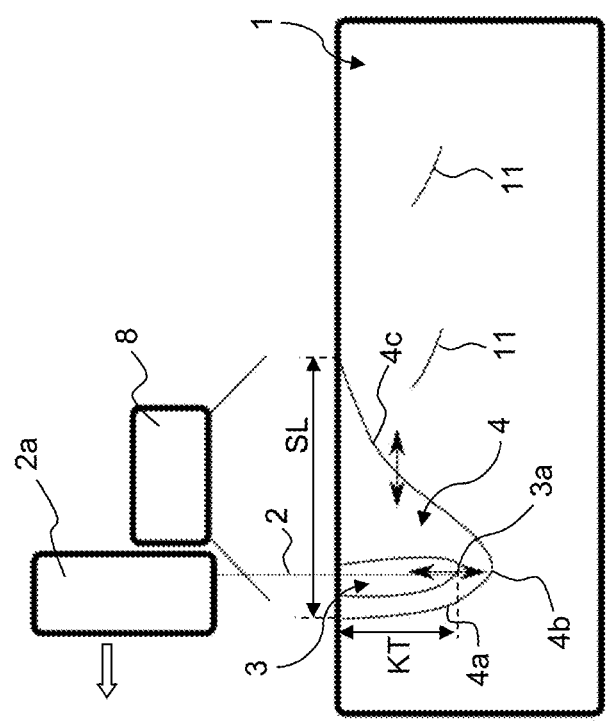
FIG. 3 is a schematic cross-section view of a workpiece during laser beam welding as described herein.

FIG. 3 shows an overview of the welding processing of a workpiece 1 with a laser beam 2. The laser beam 2 is directed from welding optics 2a to the workpiece 1. The laser beam 2 penetrates from the surface into the workpiece and vaporizes the workpiece material in its immediate proximity. A metal vapor capillary (also called capillary for short) 3 is formed, which in the case shown of in-welding extends to a base 3a (in the case of through-welding the laser beam exits the workpiece at the bottom, not shown). In the area surrounding the capillary 3, the workpiece material is melted, causing a so-called weld pool 4 of liquid workpiece material to form. Since the laser beam 2 during welding is moved relative to the workpiece 1, here leftward, the weld pool 4 in the cross section is sunken to the right. On the left edge 4a and the lower edge 4b of the weld pool 4, workpiece material is melted, while on the right edge 4c of the weld pool 4, workpiece material is re-solidifying. Here hot cracks 11 may appear in the weld seam.

During the laser beam welding, the size of the weld pool 4 is generally not constant, but fluctuates in an approximately periodic manner (regardless of any weld spatters on the weld pool surface), this phenomenon is called weld pool oscillation. The weld pool oscillation can be identified by a variable weld pool length SL. In many cases, the weld pool oscillation correlates with the size of the capillary 3, such as the capillary depth KT; note however that for strongly modulated laser power, the weld pool oscillation can be overlain or dominated by the effects of the power modulation, such as close to the capillary 3. The weld pool oscillation can be observed by a measurement system 8, which here is mechanically coupled to the welding optics 2a.

The so-called characteristic weld pool oscillation is measured on a test workpiece that is welded with an unmodulated laser beam. The welding on the test workpiece takes place otherwise under the same conditions as the later welding of the actual workpiece (but may be different in terms of the feed rate and the focal spot diameter, as these parameters may be compensated for by normalization). The beam parameter product and the average laser power, possibly including ramps, should be selected to be the same.

The characteristic oscillation frequency $f_{co}^{test}$ observed during welding of the test workpiece serves as the basis for determining a suitable modulation frequency f for the later welding of the actual workpiece. The characteristic oscillation frequency $f_{co}^{test}$ is typically determined for welding of a weld seam in total, and accordingly a modulation frequency f is also established for the entire later welding of the actual workpiece. The characteristic oscillation frequency $f_{co}$ can however also be separately determined for individual sections of the weld seam, for instance the start region, middle region, end region or overlap region (see below, FIG. 10, FIG. 11), and accordingly in each case a modulation frequency f can be established for the individual sections for the later welding of the actual workpiece. The latter should occur when the characteristic oscillation frequencies $f_{co}^{test}$ from different sections of the weld seam differ significantly from one another, for example by more than 20% (referred to the smaller oscillation frequency). When the start region and end region are welded as in-welding, but the middle region as through-welding, for the start region and end region the characteristic oscillation frequency $f_{co}^{test}$ should be separately obtained (or for the start region and end region jointly, without the middle region, for instance for axial and radial round seams).

In the later welding of the actual workpiece, by the power modulation, the weld so pool oscillation is generally strongly reduced or even fully compensated for in comparison with the welding of the test workpiece. If desired, in the later welding of the actual workpiece, the weld pool oscillation can be monitored for quality control.

Figure 4:
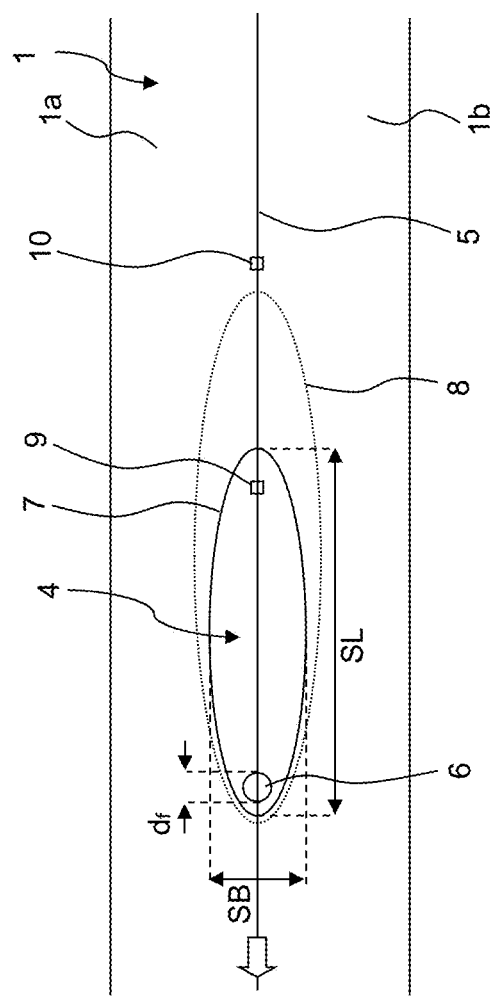
FIG. 4 is a schematic view of a workpiece during laser beam welding as described herein.

In FIG. 4, in a top view, the workpiece 1 (or the test workpiece) from FIG. 3 is visible, which here consists of two workpiece parts 1a and 1b being welded along the weld seam 5. The laser beam focal spot 6 is moved leftward relative to the workpiece 1, so that mainly to the right of the laser beam focal spot 6, the weld pool 4 is formed. Its size fluctuates here substantially periodically between a minimal extent 7 (shown as solid line) and a maximal extent 8 (shown as dotted line).

To determine the characteristic oscillation frequency $f_{co}$ or the normalized characteristic oscillation frequency $\Lambda_{co}$, a suitable parameter that represents the temperature development of the size of the weld pool, is recorded with the measurement system. For this purpose, the size of the weld pool is the simplest to record, e.g., with an infrared camera. For example, the part of the workpiece surface whose temperature is above the melting temperature of the workpiece material (or between the melting temperature and the vaporization temperature), can be regularly (e.g., intermittently) or continuously recorded. As a rule, however, it suffices to record the pool length SL or the pool width SB, for instance as a distance from the opposite material points where the melting temperature (or the solidification temperature) predominates. It is likewise possible to regularly or continuously record the temperature at a fixed point 9 with respect to the position of the laser beam focal spot 6 in the weld pool 4 or fixed point 10 in a heat path of the weld pool 4. Typically, the fixed points 9 and 10 are separated from the edge of the laser beam focal spot 6 by a multiple (e.g. at least 2× or at least 4×) of the diameter dr of the laser beam focal spot 6, or also by at least ¼ of the minimal weld pool length SL (at extent 7) along the welding direction from the edge of the laser beam focal spot 6. The fixed points 9 and 10 can lie at the center of the weld seam, but do not have to.

Figure 5:
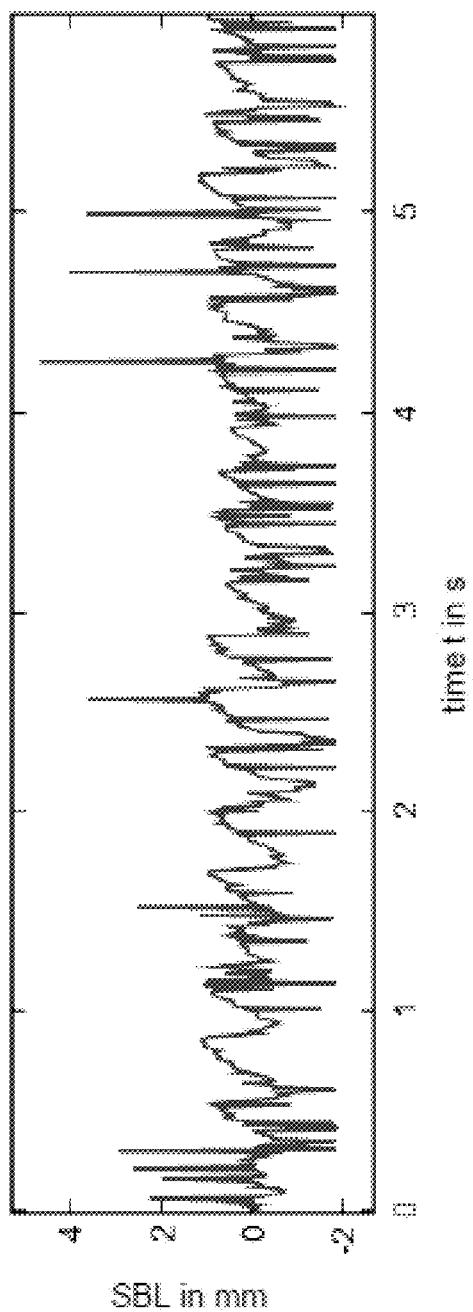
FIG. 5 is a graph representing an experimentally determined weld pool length (y-axis) as a function of time (x-axis), with a workpiece welded with a constant (unmodulated) laser power.

FIG. 5 shows a weld pool length SBL (plotted on the y-axis) determined thermographically with reference to a heat subsidence length as a function of the time (plotted x-axis) as a parameter for the weld pool oscillation in laser beam welding (again the material is steel type 42CrMoS4, Yb-YAG laser, EST of 4 mm, and SPP of 16 mm*mrad), with a continuous wave laser without power modulation. It can be seen with the naked eye that the weld pool oscillates with a frequency of a little more than 3 Hz, wherein the weld pool length fluctuates in each modulation period by around 2 mm.

The weld pool length (SBL) was here defined by the distance between the front side of the vapor capillary and the weld pool end. The weld pool end here is assumed to be at the site (with respect to direction of advance of the laser) of the heat radiation intensity profile (perpendicular to the direction of advance) with the smallest half-value width. The minimum of the half-value width results from the tapering weld pool shape and from the onset of a broad heat track behind the weld pool. The determination of the front side of the vapor capillary is made via the intensity course along the direction of advance and is defined by the site where the maximal measurable intensity of the camera sensor is reached for the first time.

Figure 6:
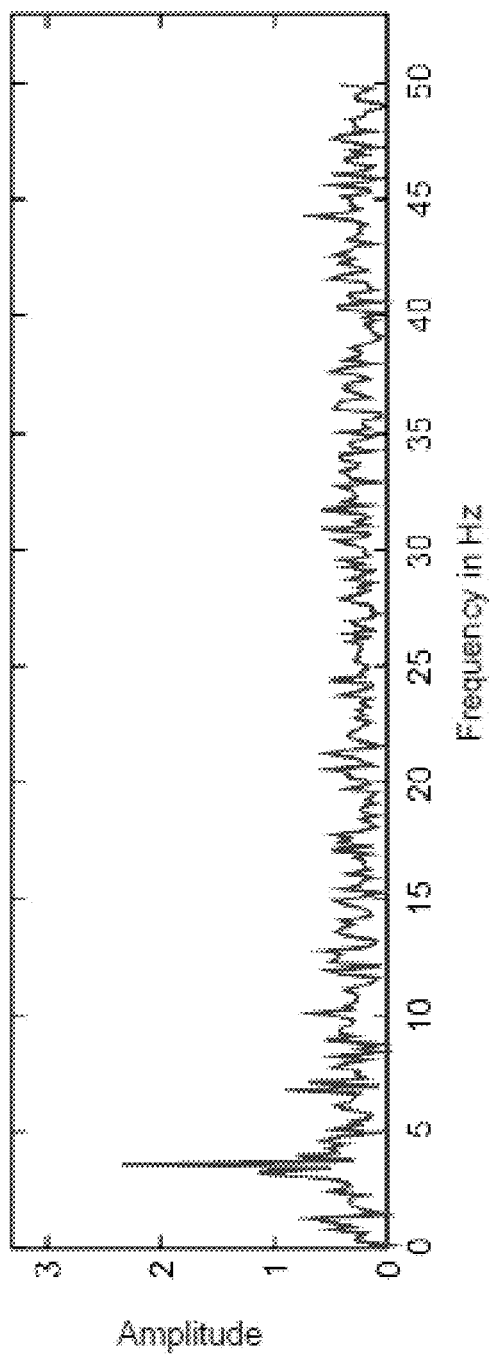
FIG. 6 is a graph representing the Fourier transform of the data of FIG. 5, the (Fourier) amplitude of the respective frequency portion (y-axis) plotted with respect to the frequency (x-axis).

FIG. 6 shows a Fourier transform of the weld pool length SBL from FIG. 5; plotted on the x-axis is the frequency and plotted y-axis is the (Fourier-) amplitude of the respective frequency component. The strongest frequency component (peak), thus the site in the Fourier spectrum with the largest (Fourier-) amplitude is located at around 3.6 Hz; at this frequency lies the (characteristic) oscillation frequency $f_{co}$ of the weld pool in good approximation.

The average amplitude of all the frequency components here is around 0.3. The amplitude at the frequency of the weld pool oscillation (peak at 3.6 Hz) is around 2.4. Thus, a normalized amplitude can be calculated as the quotient of the observed amplitude for the weld pool oscillation frequency and the average amplitude of all frequency components, of around 8. This normalized (Fourier) amplitude can be used as the reference variable for the amplitude of the weld pool oscillation, if desired, for instance for quality control. A small amplitude of the weld pool oscillation generally is accompanied by a low probability of hot cracks in the weld seam.

Figure 7:
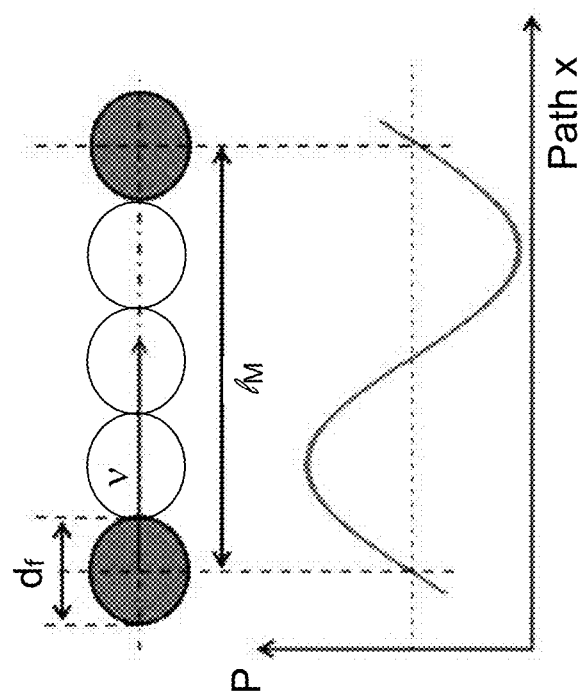
FIG. 7 is a diagram explaining the normalized frequency Λ.

To determine a suitable frequency f for a laser power modulation, the normalized frequencies should be considered. A modulation frequency f of a laser can be converted with the formula $\Lambda = f \cdot d_f / v$ to a normalized frequency $\Lambda$, wherein $d_f$ designates the diameter of the laser beam focal spot and v the (constant) feed rate of the laser beam relative to the workpiece during laser beam welding, (see FIG. 7). The reciprocal of $\Lambda$ indicates how often the diameter $d_f$ of the laser beam focal spot fits into a modulation length $l_M$. The modulation length $l_M$ indicates the path (the x-direction in FIG. 7) that the laser beam covers during one modulation period of the laser power P.

Accordingly, the normalized characteristic oscillation frequency $\Lambda_{co}$ can also be determined from a specific oscillation frequency $f_{co}$ of a test measurement.

Figure 8:
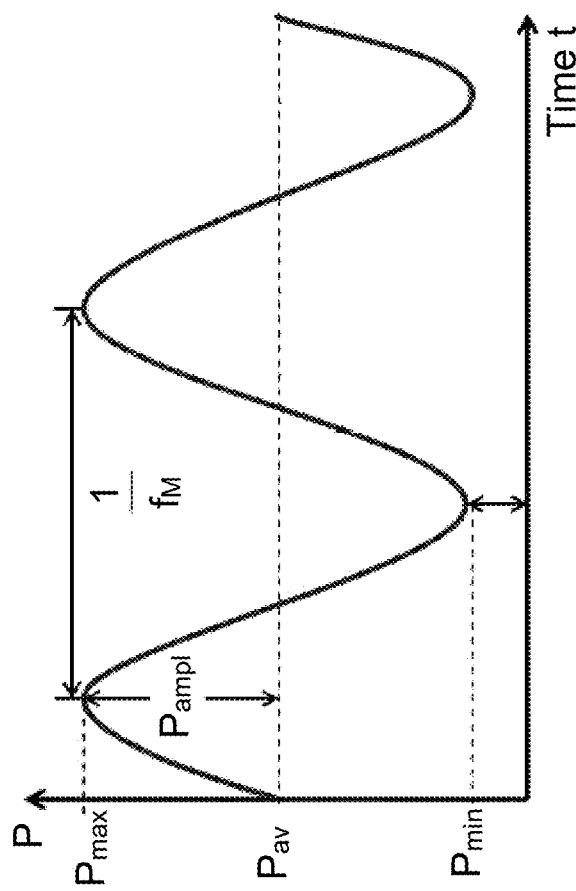
FIG. 8 is a graph explaining the normalized modulation depth Π.

For characterizing a power modulation of a laser beam, a normalized modulation amplitude $\Pi$ can be used. This is defined as $\Pi=1-P_{min}/P_{max}$, (see FIG. 8). $P_{min}$ is the minimal laser power of a modulation period, and $P_{max}$ is the maximal laser power of a modulation period (the modulation period is, for example, the time from one maximum to the next maximum of the laser power P). Apart from the modulation frequency f (also sometimes referred to as $f_M$) and the normalized modulation amplitude $\Pi$, the laser power can also be allocated a mean (average) laser power $P_{av}$, which is the power around which the laser power P oscillates due to modulation. FIG. 8 here shows a sinusoidal power modulation: note however that other modulation types, such as a pulse-form modulation, are also possible.

Figure 9:
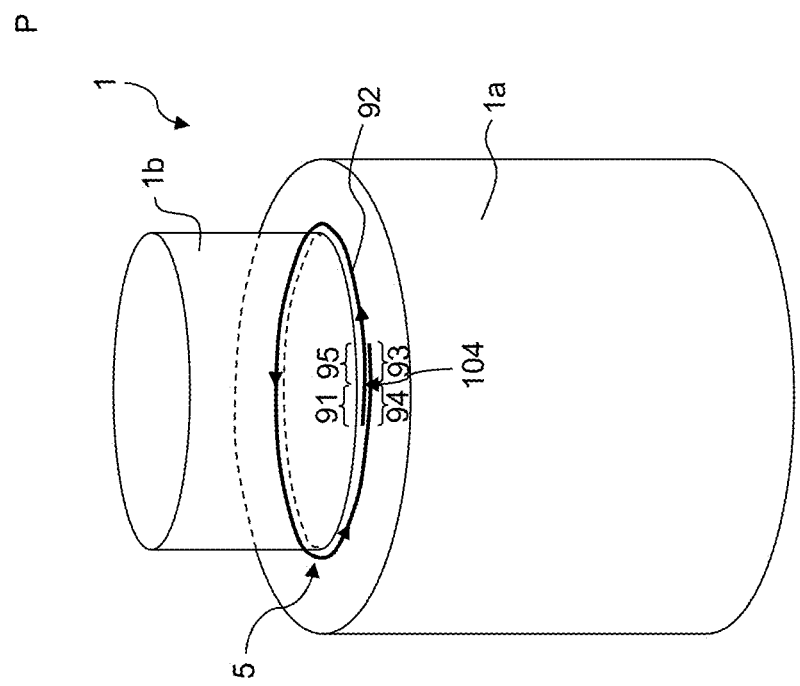
FIG. 9 is a schematic view of a workpiece on which an axial round seam is to be produced.

FIG. 9 shows a schematic view of a workpiece 1, on which an axial round seam is to be welded. The pipe-shaped workpiece part 1a and the fully cylindrical tool part 1b inserted therein are to be firmly connected to one another along the weld seam 5. Note that the weld seam 5, shown here as somewhat spread out to better perceive the particulars.

The weld seam 5 is welded in a start region 91, then further in a middle region 92, and finally in an end region 93. The weld seam 5 overlaps itself, so that the start region 91 overlaps a part 94 (of the middle region 92) of the weld seam 5, and the end region 93 overlaps a part 95 (of the middle region 95) of the weld seam 5. The start region 91 and the end region 93 directly follow one another in the circumferential direction of the weld seam 5.

In the regions 91/94 and 95/93 the weld seam 5 is welded "double" (i.e., overlap region 104). However, during the welding of the start region 91, the laser power is increased and during welding of the end region 93 the laser power is reduced ("ramps"). As described herein, modulation of the laser power takes place during welding of the start and end region.

Figure 10:
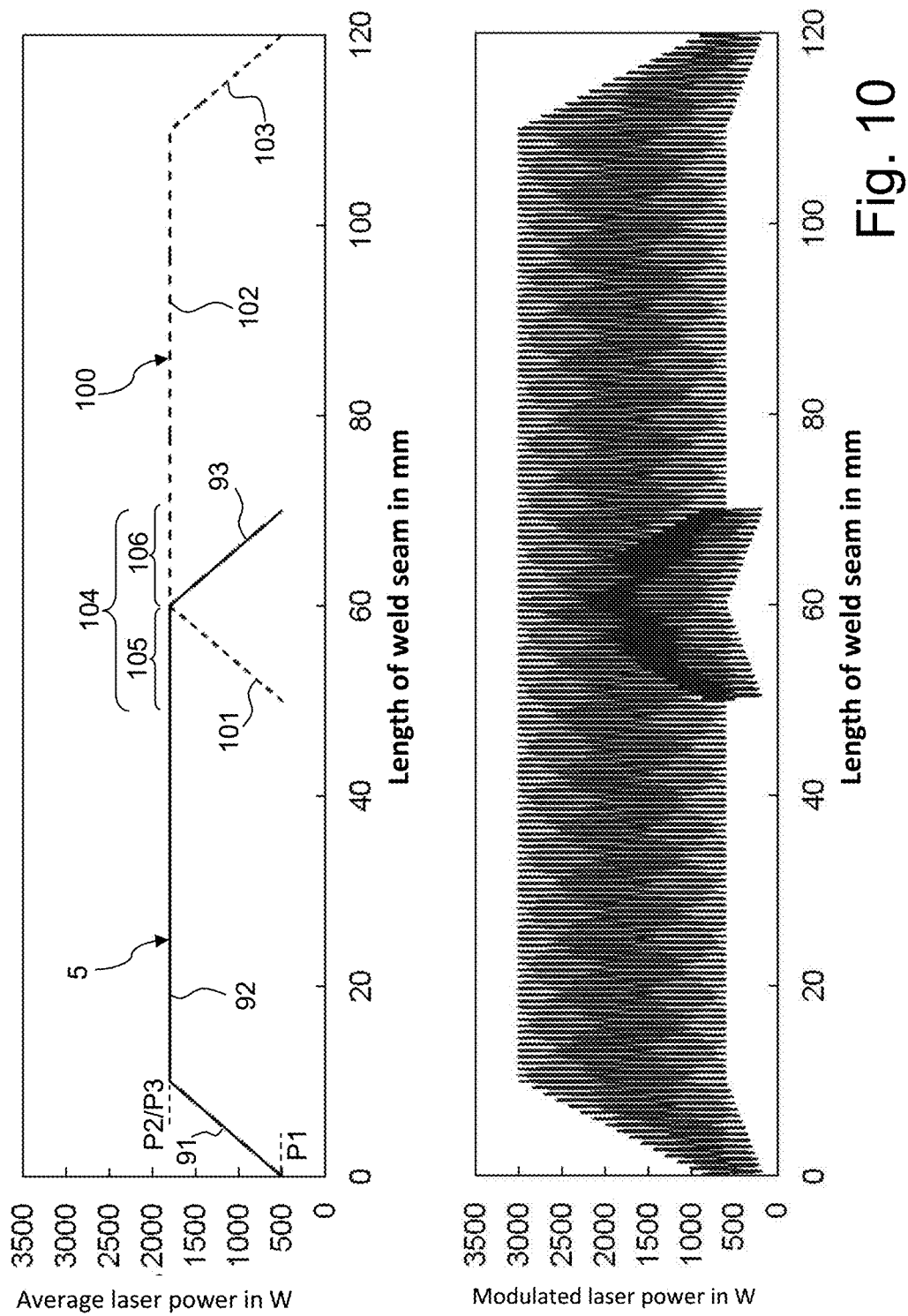
FIG. 10 is a pair of graphs representing the average laser power (above) and the modulated laser power (below) as a function of the location for exemplary laser welding with overlap of two weld seams, with in-welding.

This can be seen for example from FIG. 10. It illustrates in two partial diagrams the laser power (plotted on the y-axis) as a function of the time (plotted on the x-axis) during welding of a (first) weld seam 5, which overlaps with another (second) weld seam 100, in in-welding.

The weld seam 5 has a start region 91, a middle region 92, and an end region 93. The other weld seam 100 (broken line) for its part shows a start region 101, a middle region 102, and an end region 103. The overlap region 104 includes an overlap of the start region 101 with a part 105 of the middle region 92 and an overlap of the end region 93 with a part 106 of the middle region 102, wherein the start region 101 and the end region 93 directly follow one another.

In the upper diagram of FIG. 10, the mean (average) laser power (y-axis) is plotted as a function of the location. In the start and end regions 91, 93, 101, 103, there is a linear alteration of the laser power from P1 to P2 or vice versa ("ramps"); the average laser power P3 in the middle region corresponds to the power P2 at the top end of a respective ramp. In the lower diagram of FIG. 10, the modulated laser power (y-axis) is plotted as a function of the location (x-axis); the modulation takes place around the average laser power, here with an everywhere equal normalized modulation amplitude $\Pi$ of around 0.8 (in the middle region for example between 600 W and 3000 W).

Through the modulation (with the suitable modulation frequency $\Lambda$) the hot crack formation in the workpiece can be reduced or lowered, both in the start and end regions 91, 93, 101, 103 and in the middle regions 92, 102, and also in the overlap region 104. The continuous modulation is suited for in-welding, wherein also in the middle regions 92 and 102 the laser beam remains in the workpiece and does not break through. For measuring a test workpiece, the power indicated in the upper diagram of FIG. 10 can be applied without modulation.

Figure 11:
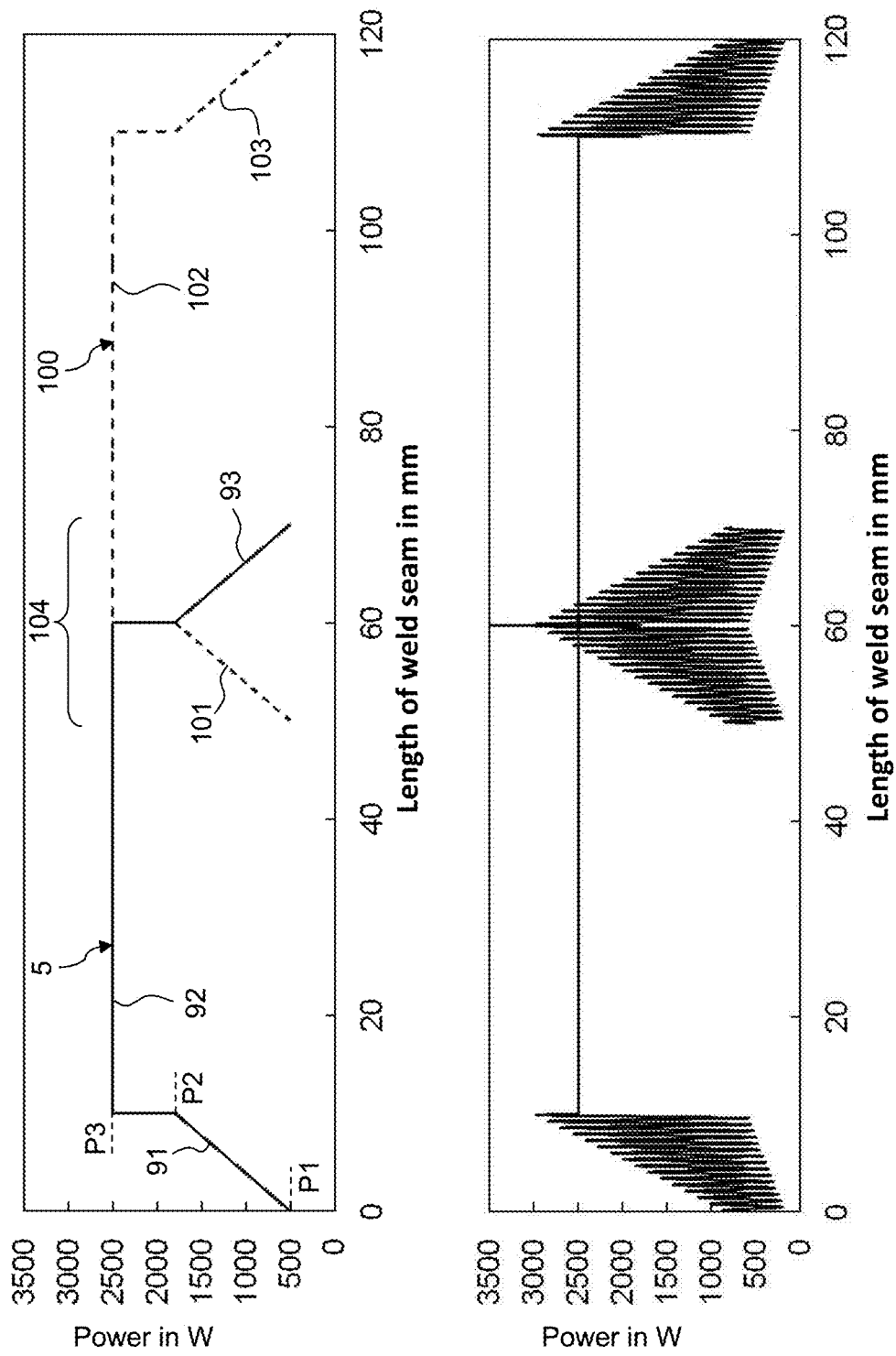
FIG. 11 is a pair of graphs representing the average laser power (above) and the modulated laser power (below) as a function of the location, for exemplary laser welding with overlap of two weld seams, with through-welding.

FIG. 11 illustrates in two partial diagrams the welding of a weld seam 5, which overlaps with another weld seam 100, similar to FIG. 10, but in through-welding in the middle regions. The differences with respect to FIG. 10 are explained. In the upper diagram of FIG. 11, which shows the average laser power (y-axis) as a function of the so location (x-axis), it is plain that at the end of the start regions 91, 101, the average laser power rises abruptly from P2 to an increased, constant laser power P3 of the respective middle region 92, 102. The increased, constant laser power P3 suffices to effect through-welding of the workpiece in the middle regions 92, 102, i.e. the laser beam emerges from the other side of the workpiece. A comparable jump in the laser power from P3 to P2 occurs at the start of the end regions 93 and 103.

In the middle regions 92, 102, in which the through-welding occurs, the laser power does not have to be modulated, since in through-welding in general, no problematic hot crack formation occurs. However, in the start and end regions 91, 93, 101, 103 processed as in-welding, e.g., in the overlap region 104, power modulation does take place, as is shown in the lower diagram of FIG. 11. Hot crack formation can be prevented there.

For the start and end regions 91, 93, 101, 103, typically a characteristic oscillation frequency $f_{co}^{test}$ is determined separately (independently of the middle regions 92, 102) with a test workpiece in advance, to be able to select a suitable modulation frequency f during production of the actual workpiece. If the shortness of the ramps greatly hampers the determination of the respective characteristic oscillation frequency $f_{co}^{test}$, the characteristic oscillation frequency $f_{co}^{test}$ of the ramps can be approximated by a welding process with constant laser power at the maximal laser power P2 of the respective ramp. At this maximal laser power P2, generally there is the greatest risk of formation of hot cracks.

Figure 12:
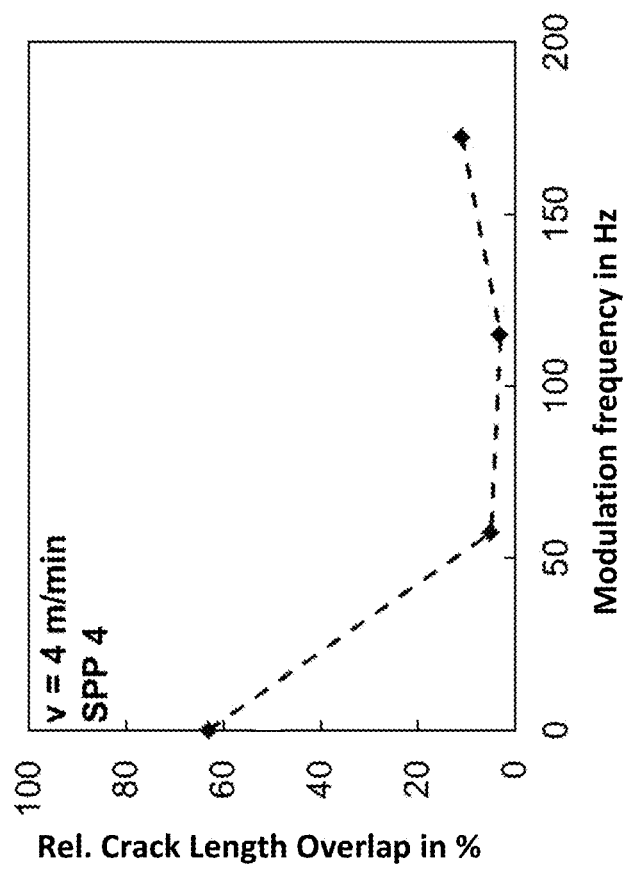
FIG. 12 is a graph representing the relative crack length (y-axis) in the overlap region of two weld seams, with different modulation frequencies (x-axis) with in-welding.

FIG. 12 shows in a diagram the relative crack lengths (y-axis) in the overlap region of two weld seams in laser beam-welded workpieces with power modulation at different modulation frequencies f, wherein the weld seams are configured as in-welds (see FIG. 10). The workpiece material again was QT steel type 42CrMoS4, welded with a Yb-YAG laser, SPP of 4 mm*mrad, feed rate 4 m/min.

With the modulation frequencies of 57 Hz and 114 Hz, hot cracks can largely be prevented in the overlap region. In contrast to this, at the higher modulation frequency of 171 Hz, there is a marked increase in the relative hot crack length in the overlap region. Without power modulation (shown at 0 Hz on the left), a significant hot crack length of around 63% occurred. Characteristic oscillations appeared in the unmodulated case in the region of 12-25 Hz, corresponding to an (averaged) characteristic oscillation frequency $f_{co}^{test}$ of around 19 Hz, again corresponding to an (averaged) normalized characteristic oscillation frequency $\Lambda_{co}$ of around 0.033 (with $d_{f,co}^{test}=0.116$ mm and $f_{co}^{test}=4$ m/min as with modulated welding).

Figure 13:
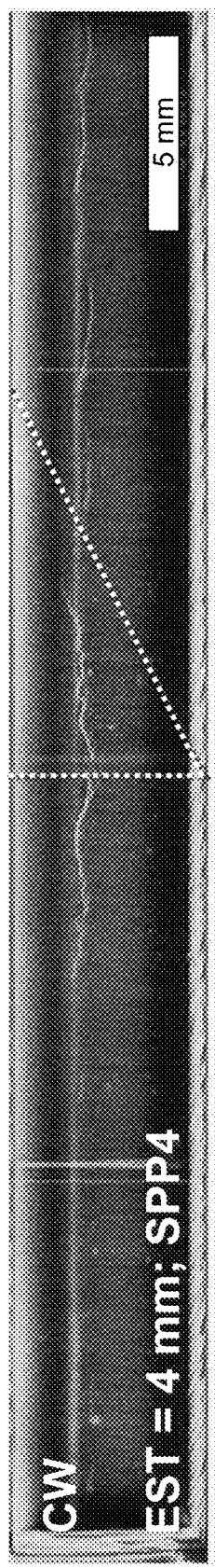
FIG. 13 is a radiographic image of a workpiece from the diagram of FIG. 12 with overlap of two weld seams, with unmodulated laser power, with in-welding, showing hot crack formation.

FIG. 13 shows a radiographic image lateral view of the entire weld seam for the unmodulated case of the experiments of FIG. 12; the overlap region is marked with an oblique, dotted line. In the overlap region and in the single welded region (middle region), hot cracks may be plainly seen.

Figure 14:
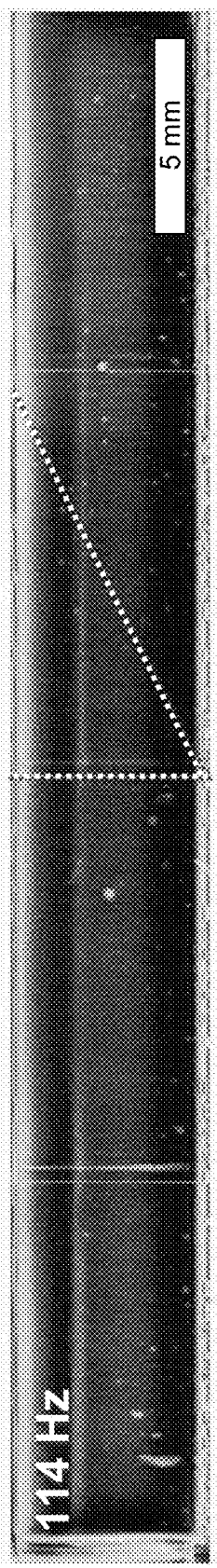
FIG. 14 is a radiographic image of a workpiece from the diagram of FIG. 12 with overlap of two weld seams, with laser power modulated at 114 Hz, with in-welding, without discernible hot crack formation.

FIG. 14 shows a radiographic image of the entire weld seam for the case of modulation at 114 Hz of the experiments of FIG. 12; the overlap region is again marked with an oblique dotted line. Practically no hot cracks can be found.

Figure 15:
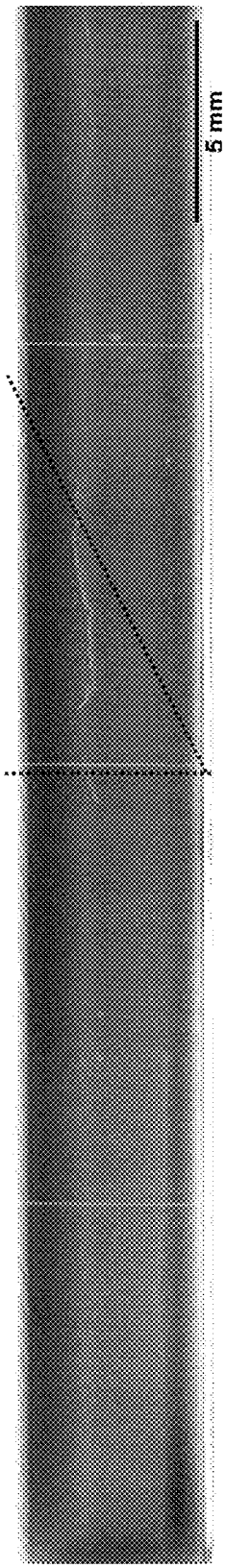
FIG. 15 is a radiographic image of a workpiece with overlap of two weld seams, with unmodulated laser power, with through-welding, with hot crack formation in the overlap region.

FIG. 15 shows a radiographic image of a typical workpiece from the side with two overlapping weld seams, which are configured as through-welds. The laser power was not modulated, including in the ramps. The workpiece material was again QT steel type 42CrMoS4, Yb-YAG-laser, SPP of 4 mm*mrad. In the overlap region (ramp region) marked by an oblique dotted line, hot crack formation is plainly seen. The single welded region (middle region) of the weld seams however is free of hot cracks, which is due to the through-welding.

Figure 16:
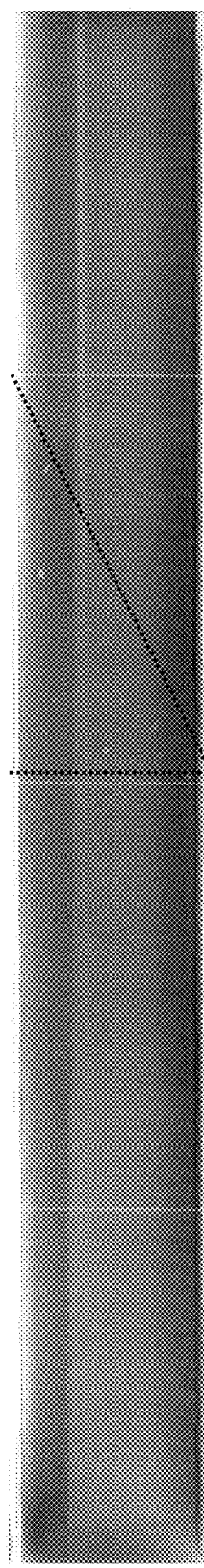
FIG. 16 is a radiographic image of a workpiece with overlap of two weld seams, with modulated laser power, with through-welding, without hot crack formation in the overlap region.

FIG. 16 shows a radiographic image of a typical workpiece from the side with two overlapping weld seams, which again are configured as through-welds. The laser power here was modulated within the ramps with $\Lambda=0.3$. The workpiece material was again QT steel type 42CrMoS4, Yb-YAG-laser, SPP of 16 mm*mrad. In the overlap region (ramp region), which is marked with an oblique dotted line, and also in the rest of the workpiece, no hot cracks are discernible.

Figure 17A:
FIGS. 17A and 17B show longitudinal sections along a welded weld seam, so wherein a workpiece part made of S235JR-steel was welded from above onto a workpiece part made of X5CrNi18-10 steel while supplying additive material, with unmodulated laser power in FIG. 17A and with modulated laser power in FIG. 17B.
Figure 17B:
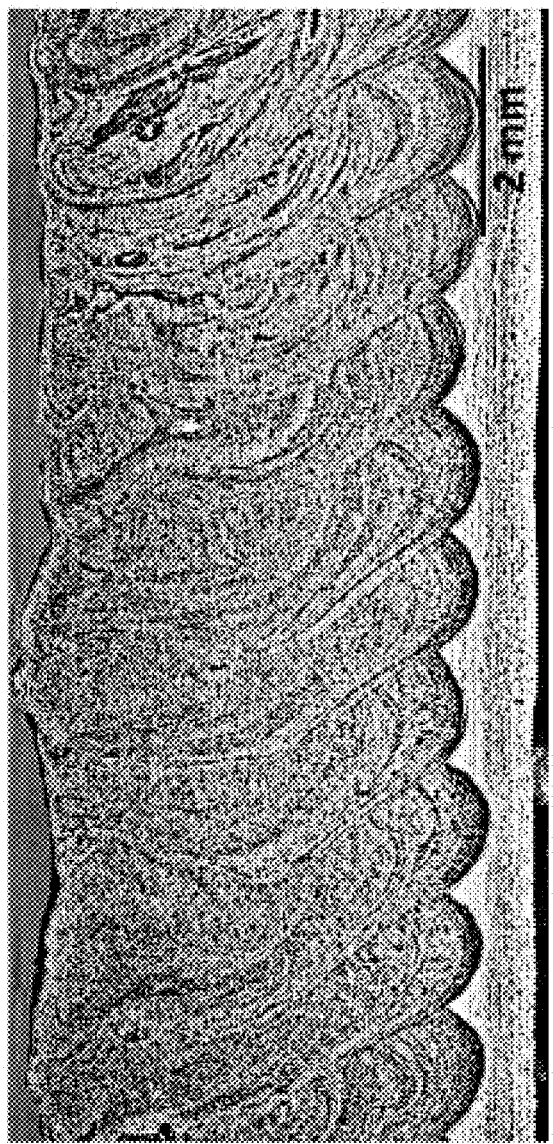

FIG. 17 shows longitudinal sections in FIG. 17A and FIG. 17B each along a welded weld seam, wherein a workpiece part made of S235JR steel was welded from above onto a workpiece part made of X5CrNi18-10 steel with supply of an Ni-containing supplementary wire (2.04806) with unmodulated laser power in FIG. 17A (laser power 1.8 kW, SPP 16 mm*mrad) and with laser power modulated in FIG. 17B (laser power 1.8 kW, SPP 16 mm*mrad, modulation amplitude $\Pi=0.8$, normalized modulation frequency $\Lambda=0.4$). In both cases with a welding rate of 1 m/min, wire feed rate 4 m/min. focal position −0.2 mm. The workpiece parts had a thickness of 2.5 mm. The weld pool in each case penetrated the upper workpiece part and protruded into the lower workpiece.

In the case of the unmodulated laser power in FIG. 17A, in the weld seam there are numerous intense, linear and planar phase boundaries between ferritic and austenitic solidified structure components, which proves poor mixing of the weld pool. In the case where the laser power is modulated in FIG. 17B, this weld seam appears to be nearly homogeneous, which demonstrates good mixing of the weld pool.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A method for laser beam welding of a workpiece, the method comprising:
   directing a laser beam at the workpiece and moving the laser beam relative to the workpiece so that the workpiece is welded along a weld seam,
   forming a weld pool on the workpiece in an area surrounding the laser beam, wherein the weld pool has a characteristic oscillation frequency $f_{co}$,
   at least intermittently modulating a laser power of the laser beam sinusoidally with a modulation frequency f and a modulation amplitude $\Pi$, where $\Pi=1-P_{min}/P_{max}$, and where $P_{min}$ is a minimal laser power during a modulation period, and $P_{max}$ is a maximal laser power during the modulation period,
   choosing the modulation frequency f such that for a normalized characteristic oscillation frequency $\Lambda_{co}$ of the weld pool and a normalized modulation frequency of the laser power $\Lambda$, $2.2*\Lambda_{co}<\Lambda<8.5*\Lambda_{co}$, where $\Lambda=f.d_r/v$ where v is a feed rate of the laser beam relative to the workpiece, and $d_r$ is a diameter of a laser beam focal spot of the laser beam, and
   welding the workpiece at least intermittently with the laser power with the modulation frequency f,
   where $$\Lambda_{co} = \frac{f_{co}^{test} \cdot d_{f,co}^{test}}{v_{co}^{test}}$$

and is determined from a test measurement with the laser beam without modulation of the laser power (P), wherein $f_{co}^{test}$ is a measured characteristic oscillation frequency during the test measurement, $d_{f,co}^{test}$ is a diameter of the laser beam focal spot during the test measurement, and $v_{co}^{test}$ is a feed rate of the laser beam relative to the workpiece during the test measurement.

2. The method of claim 1, wherein $\Lambda \geq 2.7*\Lambda_{co}$.

3. The method of claim 1, wherein $\Lambda \leq 7.3*\Lambda_{co}$.

4. The method of claim 1, wherein for the normalized modulation frequency $\Lambda$, $0.2 \leq \Lambda \leq 1.0$.

5. The method of claim 1, wherein $\Pi>0.5$.

6. The method of claim 1, wherein $\Pi \geq 0.75$.

7. The method of claim 1, wherein $\Pi \geq 0.8$.

8. The method of claim 1, wherein $\Pi \leq 0.95$.

9. The method of claim 1, wherein $\Pi \leq 0.85$.

10. The method of claim 1, wherein $\Pi \leq 0.80$.

11. The method of claim 1, wherein the laser beam welding is carried out with a penetration depth between 1.0 mm and 10.0 mm.

12. The method of claim 1, wherein the laser beam welding is carried out with a penetration depth between 3.5 mm and 8.0 mm.

13. The method of claim 1, wherein the laser beam is produced with an Nd-YAG or a Yb-YAG laser.

14. The method of claim 1, further comprising linearly increasing an average laser power of the laser beam during laser beam welding of a start region of the weld seam with advancing welding path, and linearly reducing the average laser power of the laser beam during laser beam welding of an end region of the weld seam with advancing welding path, and modulating the laser power during the laser beam welding of the start region and the end region.

15. The method of claim 14, comprising modulating the laser power during laser beam welding of a middle region of the weld seam between the start region and the end region, and welding in the middle region by in-welding.

16. The method of claim 14, comprising not modulating the laser power during laser beam welding of a middle region of the weld seam between the start region and the end region, and welding in the middle region by through-welding.

17. The method of claim 14, further comprising holding the average laser power constant during laser beam welding of a middle region.

18. The method of claim 14, wherein the start region and the end region of the weld seam overlap with a different part of the weld seam.

19. The method of claim 18, wherein the different part of the weld seam belongs to a middle region of the weld seam.

20. The method of claim 14, wherein the weld seam is an axial round seam or a radial round seam, and wherein the start region and the end region directly follow one another after completion of the weld seam in a circumferential direction.

21. The method of claim 14, wherein the start region and/or the end region of the weld seam overlap with a part of a second weld seam.

22. The method of claim 21, wherein a respective part of the second weld seam belongs to a middle region of the second weld seam, and wherein a start region of the second weld seam and the end region of the weld seam directly follow one another after completion of the weld seam and the second weld seam.

23. The method of claim 1, further comprising spreading an additive material during laser beam welding of the workpiece in the weld pool.

24. The method of claim 1, further comprising welding two workpiece parts that are produced from different materials.

25. The method of claim 24, wherein one of the workpiece parts is made of steel and the other of the workpiece parts is made of a non-steel material.

26. The method of claim 25, wherein the steel is quenched and tempered (QT) steel and the non-steel material is an aluminum alloy.

* * * * *